(12) United States Patent
Zhao

(10) Patent No.: US 9,958,610 B2
(45) Date of Patent: May 1, 2018

(54) OPTICAL FIBER STRIPPER

(71) Applicant: INNO INSTRUMENT (CHINA). INC, Weihai (CN)

(72) Inventor: Yangri Zhao, Shandong (CN)

(73) Assignee: INNO INSTRUMENT (CHINA).INC, Weihai (CN)

( * ) Notice: Subject to any disclaimer, the term of this patent is extended or adjusted under 35 U.S.C. 154(b) by 403 days.

(21) Appl. No.: 14/279,772

(22) Filed: May 16, 2014

(65) Prior Publication Data

US 2014/0338195 A1    Nov. 20, 2014

Related U.S. Application Data

(63) Continuation of application No. PCT/CN2012/075737, filed on May 18, 2012.

(30) Foreign Application Priority Data

Jan. 10, 2012    (CN) ..................... 2012 2 0008668 U

(51) Int. Cl.
*G02B 6/245* (2006.01)
*H02G 1/12* (2006.01)
*B26B 27/00* (2006.01)

(52) U.S. Cl.
CPC .............. *G02B 6/245* (2013.01); *B26B 27/00* (2013.01); *H02G 1/1209* (2013.01)

(58) Field of Classification Search
CPC . G02B 6/25; G02B 6/245; G02B 6/46; G02B 6/4484; G02B 6/4497; H02G 1/005;

(Continued)

(56) References Cited

U.S. PATENT DOCUMENTS 3,939,552 A *  2/1976  Hart ...................... H01R 43/28
                                                      29/564.2
4,271,729 A *  6/1981  Perrino ................ H02G 1/1214
                                                      30/90.1

(Continued)

FOREIGN PATENT DOCUMENTS

CN        201266262 Y      7/2009
CN        201812078 U      4/2011

(Continued)

OTHER PUBLICATIONS

Definition of 'connect' accessed at https://www.merriam-webster.com/dictionary/connect on Feb. 8, 2017.*

(Continued)

*Primary Examiner* — Stephen Choi
*Assistant Examiner* — Evan MacFarlane
(74) *Attorney, Agent, or Firm* — Anova Law Group, PLLC

(57) ABSTRACT

An optical fiber stripper includes handles, two stripping blades and an optical fiber positioning reference block, on which optical fiber jacket stripping sub-channel, covered wire/cable jacket stripping sub-channel, and bare fiber coating stripping sub-channel are disposed in parallel, and the stripping blade, respectively, contains optical fiber jacket stripping port, first port, and sharp-angle port. The present invention can be used to strip various layers through the ports on the stripping blades, to ensure that the optical fiber is not broken when stripping optical fiber, and to prevent optical fiber surface from attaching to debris, so that the optical fiber jointing efficiency is improved greatly.

6 Claims, 6 Drawing Sheets

(58) Field of Classification Search
CPC .. H02G 1/1209; H02G 1/1212; H02G 1/1297; H02G 1/1202; H02G 1/1204; H02G 1/1207; H02G 1/1214
USPC ............... 30/90.1–91.2, 299, 304, 305; 81/9.4–9.44
See application file for complete search history.

(56) References Cited

U.S. PATENT DOCUMENTS

| | | | |
|---|---|---|---|
| 2005/0044715 A1* | 3/2005 | Shutts | G02B 6/4497 30/90.1 |
| 2006/0265881 A1 | 11/2006 | Serrano et al. | |
| 2010/0058581 A1* | 3/2010 | Aguiar | G02B 6/245 29/825 |

FOREIGN PATENT DOCUMENTS

| | | |
|---|---|---|
| CN | 202093202 U | 12/2011 |
| JP | 2007171419 A | 7/2007 |
| WO | 2006130572 A2 | 12/2006 |

OTHER PUBLICATIONS

International Search Report dated Oct. 25, 2012, from the International Bureau of WIPO, in corresponding International Application No. PCT/CN2012/075737, with English translation (8 pages).

* cited by examiner

OPTICAL FIBER STRIPPER

TECHNICAL FIELD

The present invention relates to strippers for stripping jackets of optical fiber cables and coatings of optical fibers, especially to dual-mode optical fiber strippers used for cladded optical fiber cables and jumpers.

RELATED ARTS

With the continual development of communication technology, the demand for speed and quality of information transmission is increasingly high. The applications of optical communication and its advantages are increasingly wide. Thus, considerable use of optical fiber further indicates it is now an optical communication age. In optical fiber access engineering, the interior wiring near the user is most complex. The covered wire/cable, as an invention of indoor and outdoor household optical cables, began to be used in large quantity. Meanwhile, optical fiber jumpers as optical fiber directly connecting desktop computers or devices have also been used widely. The structure of optical fiber, in the order from inside to outside, is bare fiber, coating, Kevlar wire, and covered jacket. The structure of the optical fiber jumpers, in the order from inside to outside, is bare fiber, coating, buffer layer optical fiber jacket having an outside diameter of 900 µm, Kevlar wire, and jumper jacket. In specific construction, two covered wire/cable/jumpers are jointed according to practical situation, i.e., jointing the optical fibers in covered wires and cables/jumpers by cold jointing or hot jointing. At this time, for convenience in jointing operation, it is required to strip the jacket of the covered wire/cable/jumper, buffer layer of the jumpers having an inside and outside diameters of 900 µm, and the coating of bare optical fiber (an outside diameter is 250 µm) until fiber cores are exposed. To meet different stripping requirements of covered wires/cables and jumpers, construction workers' tool boxes usually have various tools, including Kevlar scissors for stripping jumper jacket and Kevlar reinforcing layer, wire stripper for stripping the jacket of the covered wires/cables, optical fiber stripping tool for stripping the bare fiber coating having an outside diameter of 250 µm, and stripping tool for stripping optical fiber jacket having an outside diameter of 900 µm. It is necessary to frequently change tools during construction, complicating operations. In addition, it is not easy to carry and manage these tools and it also affects the development of miniaturizing construction tool boxes.

The optical fiber jointing methods include cold jointing (mechanical jointing) and hot jointing (hot fusion jointing). Different jointing methods require different reserved lengths of coatings and bare fibers. The existing strippers cannot meet the requirements of optical fiber cold jointing and hot jointing, simultaneously.

SUMMARY OF THE INVENTION

The present invention mainly provides optical fiber strippers, which are tools that can conveniently and effectively strip the jacket of covered wire/cable, the optical fiber jacket of jumpers having an inside and outside diameters of 900 µm, and the bare fiber coating of covered wire/cable/jumpers.

An optical fiber stripper includes a first handle, a second handle, a first stripping blade, a second stripping blade, a reference block, and a stroke-adjusting device, in which the first handle and the second handle, respectively, are movably connected with the reference block through handle rotating shaft. The first stripping blade and the second stripping blade are, respectively, disposed on the first handle and the second handle through blade rotating shaft. Optical fiber guide channels for passing optical fibers are disposed on reference block. The optical fiber guide channels include optical fiber jacket stripping sub-channel for stripping optical fiber jacket having an outside diameter of 900 µm, covered wire/cable jacket stripping sub-channel for stripping covered wire and cable jacket, and bare fiber coating stripping sub-channel for stripping bare fiber coating having an outside diameter of 250 µm. The optical fiber jacket stripping sub-channel, the covered wire/cable jacket stripping sub-channel, and the bare fiber coating stripping sub-channel are disposed in parallel; and blade positioning guide channel interconnected with the first stripping blade and the second stripping blade, respectively, is disposed on the up and down cutting direction through the optical fiber guide channel. The first stripping blade and the second stripping blade move up and down in the blade positioning guide channel to cut an object of interest. The stroke-adjusting device is connected with the reference block for adjusting the cutting stroke of the first stripping blade and/or the second stripping blade.

Stroke-adjusting device includes at least a top block pin and a corresponding adjustable screw, in which the top block pin is disposed on the reference block, and the corresponding adjustable screw is disposed on the first handle and/or the second handle, and abuts the corresponding top block pin on the opposite side.

The first stripping blade and the second stripping blade, respectively, include first port and optical fiber jacket stripping port. Optical fiber jacket stripping port, first port, and sharp-angle port, which are, respectively, disposed in correspondence to optical fiber jacket stripping sub-channel, covered wire/cable jacket stripping sub-channel, and bare fiber coating stripping sub-channel. The bottom end surface of the first port and the end surface of the optical fiber jacket stripping port contain blades. First groove for holding optical fiber and for passing bare fiber without being damaged is disposed on the bottom of the first port along the moving direction of the optical fiber. The covered wire/cable jacket stripping sub-channel includes grooves fitting the first port. When the first stripping blade and the second stripping blade are in a pressing state, the first stripping blade and the second stripping blade tightly clamp the optical fiber and the first groove forms a channel, through which the bare fiber can pass without being damaged.

The first stripping blade and the second stripping blade, respectively, contain sharp-angle port. The bottom surface of the sharp-angle port contains blades. Second groove holding fiber core having the bare fiber coating stripped is disposed on the moving direction of the optical fiber at the bottom of the port. The bare fiber coating stripping sub-channel includes optical fiber guide channels fitting the sharp-angle port. When the first stripping blade and the second stripping blade are in a pressing state, the first stripping blade and the second stripping blade tightly clamp the optical fiber and the second groove forms a channel, through which the fiber core having coating stripped can pass through without being damaged.

The first handle and the second handle, respectively, include elongated slots. The first stripping blade is installed in the elongated slot of the first handle through blade rotating shaft and the second stripping blade is installed in the elongated slot of the second handle through blade rotating shaft. The first handle and the second handle, respectively, are movably connected with reference block through handle rotating shaft. Blades of the first stripping blade and the second stripping blade are disposed in a cutting direction.

The first handle and the second handle, respectively, contain length-positioning rulers.

The reference block contains several notches and blade-positioning guide channels. The notches include adaptor channels and optical fiber guide channels. The blade-positioning guide channels extend throughout the entire reference block and are interconnected with adaptor channels and optical fiber guide channels. The first stripping blade and the second stripping blade are disposed on two sides of the blade-positioning guide channels, respectively. The first ports of the stripper correspond to adaptor channels on reference block and the sharp-angle ports of the stripper correspond to the optical fiber guide channels.

The outside of the sharp-angle ports can be formed into chamfers.

Preferably, optical fiber strippers also include clamping devices, which are disposed in bare fiber coating stripping sub-channel for fixing or adjusting the distance from the clamping point on the clamping device to the cutting points of the first stripping blade and the second stripping blade at the cutting state along the direction of optical fiber.

Preferably, clamping devices include several baffle grooves and baffles fitting the baffles grooves. The baffle grooves are disposed in the bare fiber coating stripping sub-channel and the baffles can be clamped in one of the baffle grooves. The ends of the baffles in different baffle grooves serve as clamping points, the distances between the cutting points of the cutting edge of the first stripping blade and the second stripping blade are different in the cutting state.

Preferably, baffles are clamped in each groove and the distance from the clamping point to the cutting point of the blade corresponds to the length of an optical fiber coating.

Preferably, outside of the sharp-angle ports are formed into chamfers.

Preferably, baffles contain "V"-shaped port, and the bottom of "V"-shaped port include curved channels.

One end of bare fiber coating stripping sub-channel further contains V-shaped positioning block. The V-shaped positioning block is 2-3 mm coating positioning block. The V-shaped positioning block has V-shaped bottom, which is slightly higher than the channels to support bare fiber. 18 mm coating positioning block is disposed at one side of baffle groove.

The present invention uses the first stripping blade and the second stripping blade disposed in the cutting direction to strip the jacket of the covered wire/cable. By adjusting adjustable screws (the adjustable screws are only examples of stroke-adjusting device, but not limited to them), the angle between the first handle and the second handle, when clenched, and reference block can be changed so as to change cutting strokes of the blades and to adjust strokes of the handles using adjustable screws to prevent optical fiber from being damaged by the stripper during stripping.

Guide channels include optical fiber jacket stripping sub-channels for stripping 900 μm optical fiber jacket, covered wire/cable jacket stripping sub-channels for stripping covered wire/cable jacket, and bare fiber coating stripping sub-channels for stripping bare fiber. The optical fiber jacket stripping sub-channels, covered wire/cable jacket stripping sub-channels, and bare fiber coating stripping sub-channels are disposed in parallel. By using the device of the present invention, the effects of stripping the jacket of covered wire/cable and the coating of bare fiber, and the effects of stripping the jacket of optical fiber having the outside diameter of 900 μm can be achieved. According to embodiments of the present invention, the strippers include optical fiber jacket stripping port, first port, and sharp-angle port, so that strippers can strip not only the covered wire/cable, but also bare fiber coating and optical fiber jacket having an outside diameter of 900 μm.

In addition, the bottoms of first port and sharp-angle port of strippers contain small grooves, so that the strippers of the present invention can not only quickly and cleanly strip fibers, but also allow bare fibers of covered wire/cable having the jacket stripped and fiber core having the coating stripped to pass through without being damaged.

The present invention ensures that optical fiber is not broken during optical fiber stripping and prevents optical fiber surfaces from attaching to debris, greatly improving optical fiber jointing efficiency.

The present invention also includes adaptor channels and optical fiber guide channels. The adaptor channels and optical fiber guide channels can hold covered wire/cable to cut covered wire/cable jacket and bare fiber coating, respectively. It can also accurately position the length of reserved bare fiber coating with high accuracy and with ease to use.

When optical fiber is cold jointed, there are special requirements for the length of optical fiber coating. To accurately reserve the length of coating, reference block of the present invention has several baffle grooves and positioning blocks. According to the actual length of the reserved coating, insert baffles into corresponding baffle grooves, align optical fiber with baffles, or align with corresponding positioning blocks. After the blades are folded, pull out optical fiber, then remove excess coating, and the coating with required length remains. Thus, the present invention provides accurate positioning and ease to use.

A V-shaped structure is disposed on the right side of bare fiber coating stripping sub-channel. The V-shaped bottom is slightly higher than the channel bottom of optical fiber guide channel, forming positioning block, serving two functions: first, the afore-mentioned 2-3 mm coating positioning block, and second, positioning bare fiber, i.e., when bare fiber is placed in optical fiber guide channel, the right end of bare fiber can be pulled from the V-shaped structure, which makes it convenient for the extended bare fiber to fall accurately within the cutting range of V-shaped blade.

The strippers, after a long time of use, may have offsets, reducing stripping efficiency. The first handle and the second handle of the optical fiber stripper of the present invention contain adjusting screws. Because optical fiber stripper, after long time of use, may have offsets, the degree of pressing offset of the first handle and the second handle can be adjusted by adjustable screw to adjust cutting depth of covered wire/cable, when the first stripping blade and the second stripping blade snap, thus, solving the existing problem of inability for optical fiber stripper to adjust offsets.

The order of arrangement of optical fiber jacket stripping sub-channel, covered wire/cable jacket stripping sub-channel, and bare fiber coating stripping sub-channel of the present invention can be randomly combined and is not specifically limiting. However, optical fiber jacket stripping port, first port, and sharp-angle port on the first stripping blade and the second stripping blade should fit them.

The existing strippers have scales on handles. However, they are not accurate and cannot meet the accuracy requirements of optical fiber jointing. Whereas, the present invention can accurately position the length by clamping baffles into grooves.

SPECIFIC EMBODIMENTS

The following drawings are used to further illustrate the present invention.

Embodiments

Figure 1:
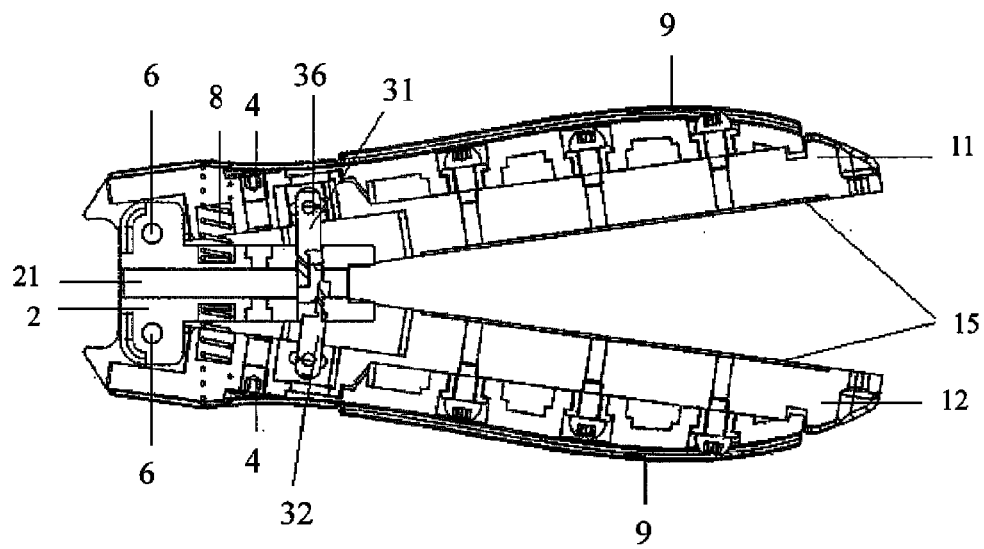
FIG. 1 shows a diagram of an optical fiber stripper according to an embodiment of the present invention.
Figure 2:
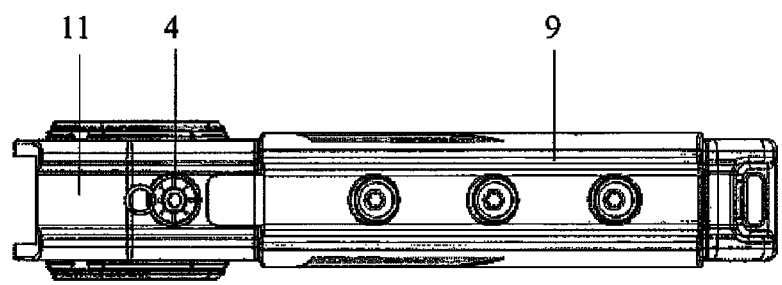
FIG. 2 shows a top view of an optical fiber stripper according to an embodiment of the present invention.
Figure 3:
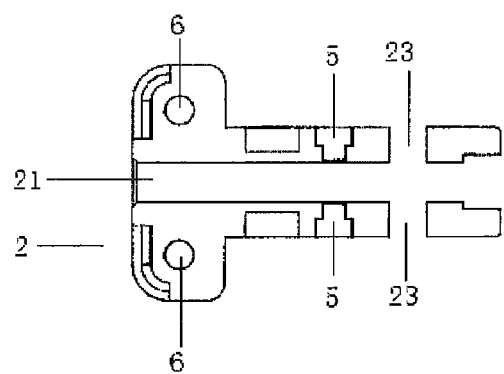
FIG. 3 shows a diagram of a reference block according to an embodiment of the present invention.
Figure 4:
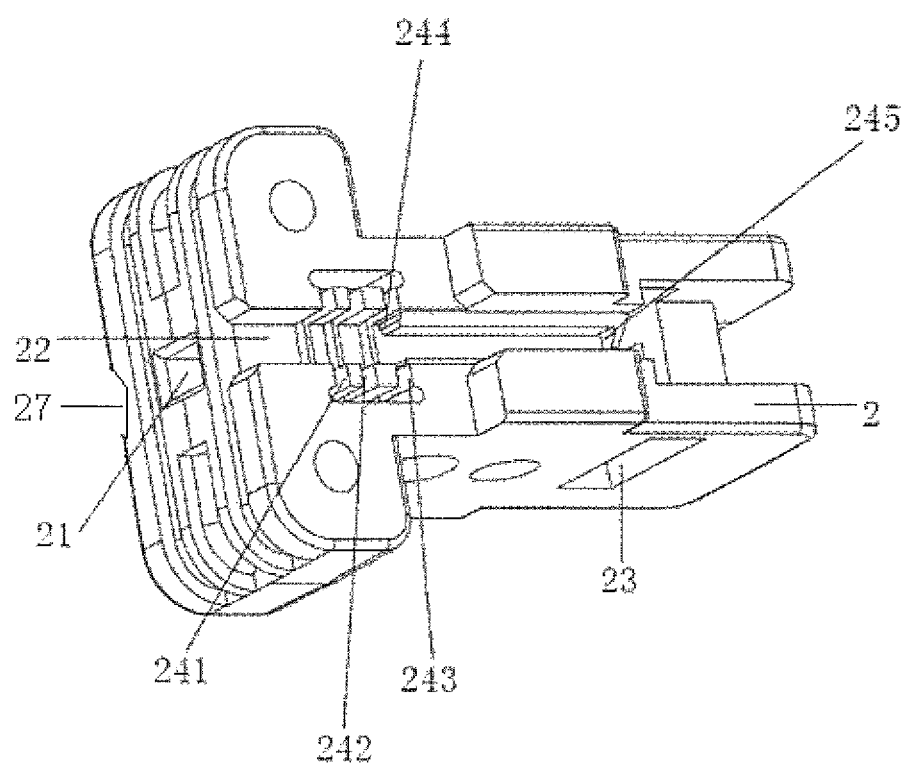
FIG. 4 shows another diagram of a reference block according to an embodiment of the present invention.
Figure 5:
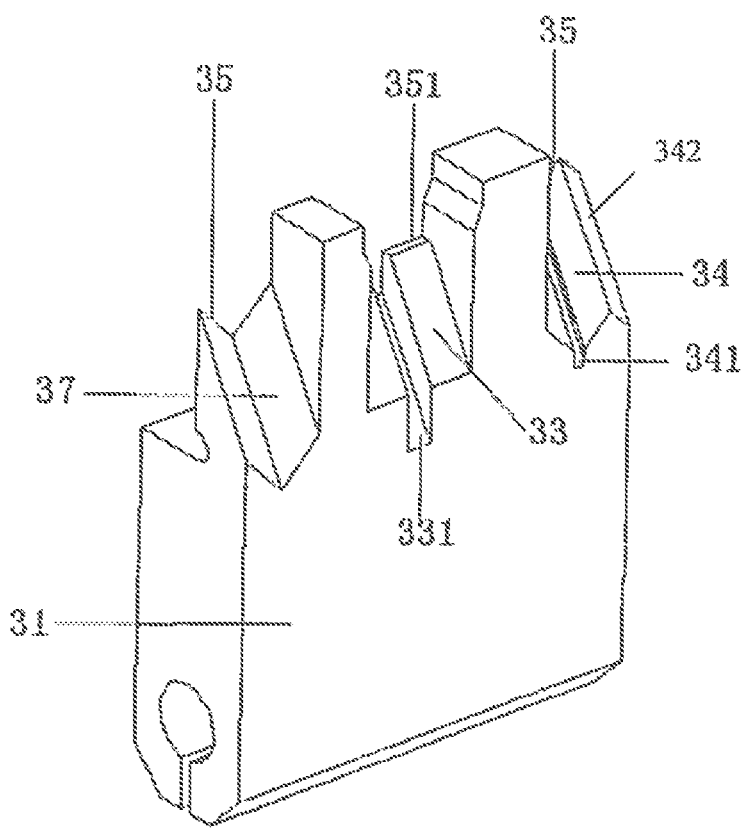
FIG. 5 shows a diagram of a stripper blade according to an embodiment of the present invention.
Figure 6:
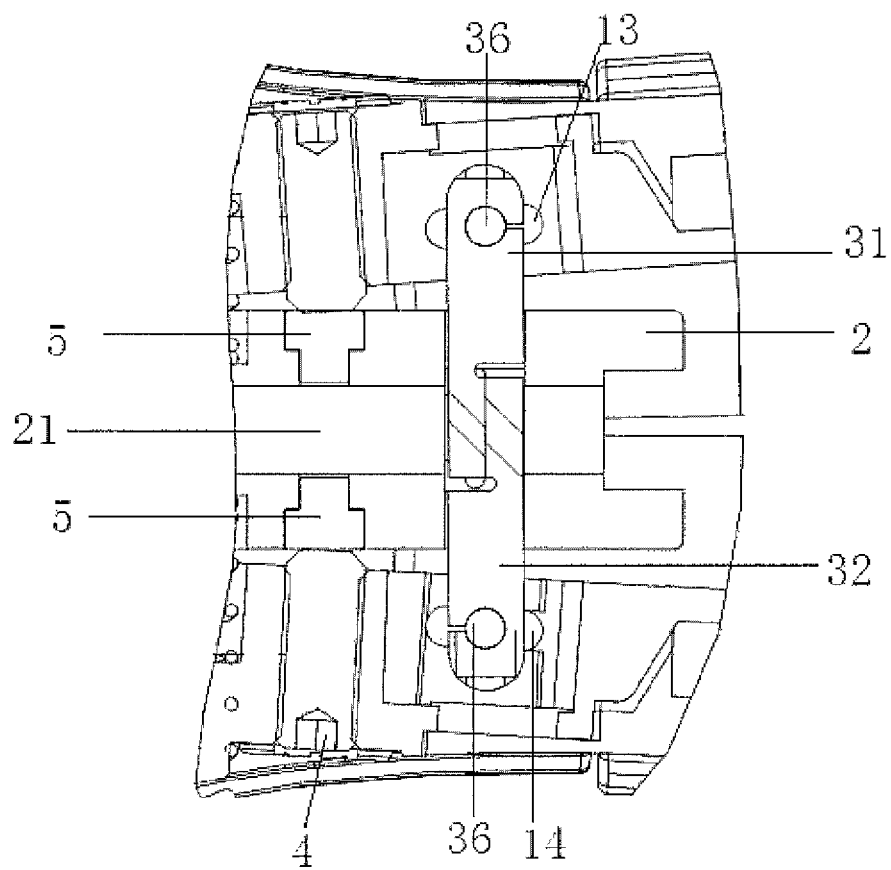
FIG. 6 shows a partial diagram of a stripper blade, when cutting, according to an embodiment of the present invention.
Figure 7:
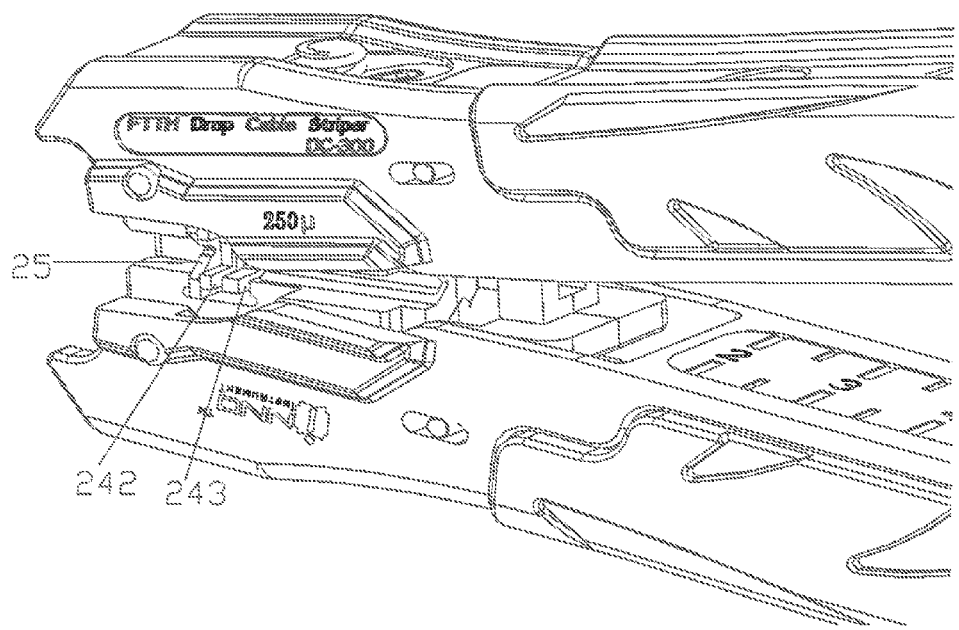
FIG. 7 shows another diagram of an optical fiber stripper according to an embodiment of the present invention.
Figure 8:
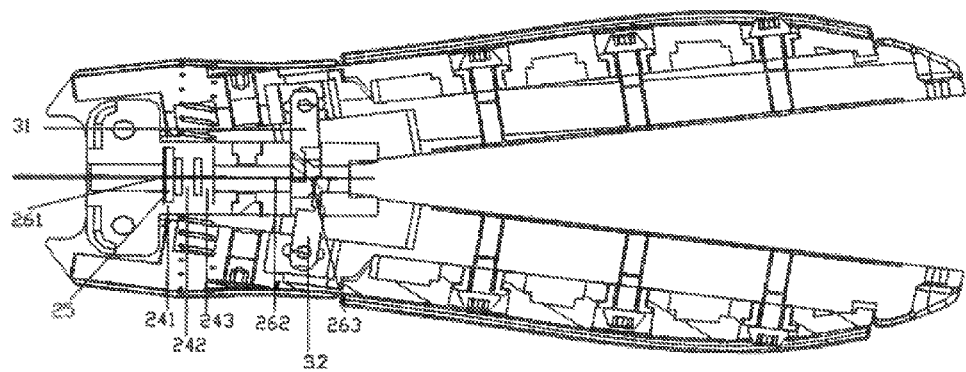
FIG. 8 shows a diagram according to an embodiment of the present invention in service mode.
Figure 9:
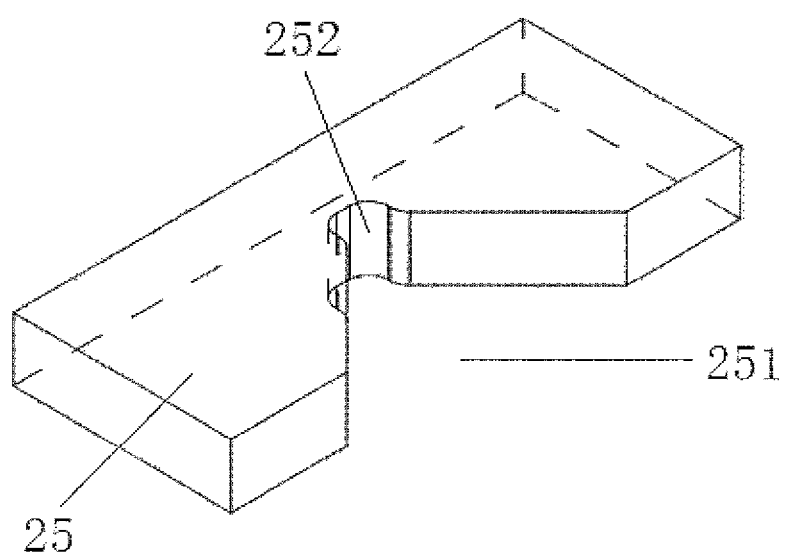
FIG. 9 shows a diagram of a baffle according to an embodiment of the present invention.

Please refer to FIG. 1 to FIG. 9, an optical fiber stripper includes a first handle 11, a second handle 12, a first stripping blade 31, a second stripping blade 32, and a reference block 2. The first stripping blade 31 is installed in elongated slot 13 of the first handle 11 through blade rotating shaft 36, and the second stripping blade 32 is installed in elongated slot 14 of the second handle 12 through blade rotating shaft 36. The first handle 11 and the second handle 12, respectively, are movably connected with the reference block 2 through handle rotating shaft 6. However, elongated slot 13 can be absent. The above description is only an example and not meant to limit the present invention.

When the first stripping blade 31 and the second stripping blade 32 are at the clamping state, the first stripping blade 31 and the second stripping blade 32 are interlaced in a form of scissors, in this way, to perform cutting operation. The present invention refers to the principle of scissors to perform cutting operation of the first stripping blade 31 and the second stripping blade 32. Of course, as long as it can perform cutting, other structures can also be used.

The first handle 11 and the second handle 12 may have length positioning scale 15 for measuring the length of optical fiber.

Optical fiber jacket stripping sub-channel 27 for stripping the jacket of 900 μm optical fiber, covered wire/cable jacket stripping sub-channel 21 for stripping the jacket of covered wire/cable, and bare fiber coating stripping sub-channel 22 for stripping the coating of bare fibers are disposed on reference block 2. Blade-positioning guide channel 23 is disposed through the up and down cutting direction in optical fiber guide channel interconnected with the first stripping blade 31 and the second stripping blade 32, respectively. The first stripping blade 31 and the second stripping blade 32 can move up and down in the blade positioning guide channel to cut an object of interest. Optical fiber guide channel includes covered wire/cable jacket stripping sub-channel for stripping the jacket of covered wire/cable and bare fiber coating stripping sub-channel for stripping the coating of bare fibers. The covered wire/cable jacket stripping sub-channel and the bare fiber coating stripping sub-channel are disposed in parallel. Parallel means that the covered wire/cable jacket stripping sub-channel and the bare fiber coating stripping sub-channel do not intercept. The best embodiment is that the covered wire/cable jacket stripping sub-channel and the bare fiber coating stripping sub-channel are in parallel.

Optical fiber stripper may also include a stroke-adjusting device, which is connected with reference block to adjust cutting stroke of the first stripping blade 31 and/or the second stripping blade 32. In this embodiment, stroke-adjusting device may include adjustable screws 4 and top block pin 5. Top block pins 5 may be two and installed, respectively, on reference block 2. Corresponding adjustable screws 4 may be disposed on the first handle 11 and the second handle 12, and abut the corresponding top block pin on the opposite side. The cutting stroke of the first stripping blade 31 and the second stripping blade 32 can be adjusted through adjustable screws 4. Of course, top block pin 5 may only be one, disposed on the first stripping blade 31 or the second stripping blade 32, and can only adjust the cutting stroke of the first stripping blade 31 or the second stripping blade 32. Stroke-adjusting device may be generated by other existing methods, and not limiting to this. The above is only for illustration.

First port 33 and 900 μm optical fiber jacket stripping port 37 are disposed on the first stripping blade 31 and the second stripping blade 32, respectively. Blades 35 are disposed on the bottom end surface of the first port and on the end surface of the 900 μm optical fiber jacket stripping port. First groove 331 is disposed on the bottom of the first port 33 along the moving direction of optical fiber, holding optical fiber and allowing bare fiber to pass through without being damaged. The covered wire/cable jacket stripping sub-channel includes adaptor channel 21 fitting the first port. When the first stripping blade 31 and the second stripping blade 32 are in a pressing state, the first stripping blade and the second stripping blade tightly clamp optical fiber and the first groove forms a channel, through which bare fiber can pass without being damaged. This structure mainly achieves tightly clamped optical fiber and exactly cuts covered wire/cable without damaging optical fiber. The jacket can be stripped by cutting the jacket of covered wire/cable and then pull out the covered wire/cable in an opposite direction. The optical fiber jacket stripping port is "V"-shaped groove. After snapping optical fiber jacket stripping ports on the first stripping blade 31 and the second stripping blade 32, gaps remain at blade contact regions at the groove bottom of optical fiber jacket stripping port. These gaps allow optical fiber to pass through. The snapped optical fiber jacket stripping port can cut the jacket of optical fiber having an outer diameter of 900 μm without damaging optical fiber. The shape of the first port 33 is square but may be other shapes, not limiting to these.

Sharp-angle port 34 is disposed on the first stripping blade 31 and the second stripping blade 32, respectively, and has blades disposed at the bottom end faces. The second groove 341 holding fiber core having the coating stripped is disposed on the port bottom along the moving direction of optical fiber. The bare fiber coating stripping sub-channel includes optical fiber guide channels 22 fitting the sharp-angle port. When the first stripping blade 31 and the second stripping blade 32 are in a pressing state, the first stripping blade 31 and the second stripping blade 32 tightly clamp optical fiber, and the second groove forms a channel, through which fiber core having coating stripped can pass without being damaged. Place bare fiber having coating stripped on optical fiber guide channel 22 of reference block, use clamping device on reference block for positioning, then, tighten up the handle, allow the first stripping blade 31 and the second stripping blade 32 to close inwardly from two ends of the blade positioning guide channel 23. Then, pull the covered wire/cable stripper along the horizontal direction of optical fiber to remove the coating of bare fiber. As an example, with this structure, it is extremely convenient to strip the coating of bare fiber. The clamping device also includes V-shaped positioning block disposed at one end of bare fiber coating stripping sub-channel. V-shaped positioning block is a 2-3 mm coating positioning block and 18 mm coating positioning block is disposed at one side of a baffle groove.

Following are specific embodiments including the two structures above.

EXAMPLE

The first stripping blade 31 and the second stripping blade 32, respectively, contain port 37 for stripping optical fiber jacket having the outside diameter of 900 μm, a first port 33 (due to the shape of the port similar to square shape, it is also referred to as square port), and sharp-angle port 34. The first groove 331 is disposed in the middle position at the bottom of the first port 33 and the second groove 341 is disposed at the bottom of the sharp-angle port 34. Blades 35 are disposed on the first port 33, sharp-angle port 34, and port 37 for stripping optical fiber jacket having the outside diameter of 900 μm. Blades 35 of the first stripping blade 31 and the second stripping blade 32 are disposed in cutting direction. Reference block 2 contains optical fiber jacket stripping channel 27, adaptor channel 21, and optical fiber guide channel 22; as well as blade positioning guide channel 23 disposed throughout reference block 2 interconnected with optical fiber jacket stripping channel 27, adaptor channel 21, and optical fiber guide channel 22. The first stripping blade 31 and the second stripping blade 32 are, respectively, disposed on two sides of blade positioning guide channel 23. The first ports 33 of the first stripping blade 31 and the second stripping blade 32 correspond to square adaptor channel 21 on reference block 2; sharp-angle port 34 corresponds to optical fiber guide channel 22; and port 37 for stripping optical fiber jacket having the outside diameter of 900 μm corresponds to optical fiber jacket stripping channels 27. Top block pins 5 are disposed on reference block 2. Adjustable screws 4 of the first handle 11 and the second handle 12, respectively, abut the top block pins on the opposite side.

The outside of sharp-angle port 34 may contain chamfer 342. Blades 35 may be passivated according to actual need to make blades to become blunt blade 351. Optical fiber is not easily damaged by this approach, when bare fiber having coating stripped is placed into optical fiber guide channel 22 at the beginning. Moreover, this treatment can meet the blade damage-free requirements for stripping steel wire enforcement cores of covered wire/cable, in addition to stripping common wire/cable.

Springs 8 are disposed, respectively, between the first handle 11 and the second handle 12 and reference block 2, thus, springs 8 make the first handle 11 and the second handle 12 to be in an open state.

In addition, rubber handles 9 are disposed, respectively, on the outside of the first handle 11 and the second handle 12 for easy grip.

In this example, another structure needs to be introduced. The optical fiber stripper of the present invention may also include clamping device, which can be disposed in optical fiber guide channel for fixing or adjusting the distance from the clamping points on the clamping device to the cutting point of the first stripping blade and the cutting point of the second stripping blade in the cutting state along the direction of optical fiber. The accuracy is inadequate, if coating length was measured by ruler. The clamping device of the present invention can fix the distance from the clamping point to the cutting point to correspond to a distance of coating. Several distances from clamping points to cutting points can be fixed according to actual needs.

One implementation is: clamping device includes several baffle grooves and baffles clamped into the baffle grooves. Baffle grooves are disposed in the optical fiber guide channel. Baffles can be clamped into one of the baffle grooves. Using left ends of baffles located in different baffle grooves as clamping points, the distances from the camping points to the cutting points of the first stripping blade and the second stripping blade in the state of cutting are different. Baffle clamped into each groove, the distance from the baffle's clamping point to the cutting points of the blade corresponds to a coating distance. However, this structure is not the only example. As long as setting corresponding clamping points based on the distance from the clamping point to the cutting point of the blade can be performed, it falls within the scope of the present invention.

EXAMPLE

Optical fiber guide channel 22 of reference block 2 contains a first baffle groove 241, a second baffle groove 242, and a third baffle groove 243. Baffle 25 contains "V"-shaped port 251. The bottom of "V"-shaped port 251 contains curved channel 252.

One end of optical fiber guide channel 22 also contains V-shaped positioning block 245. The V-shaped positioning block 245 is a 2-3 mm coating positioning block. The right side of the third baffle groove 243 is 18 mm coating positioning block 244.

Using reserved coating of 24 mm as an example, first, strip part of jacket of cables to form stripping port 261 on the cable. Strip jacket of cables to expose coating 262. Insert baffle 25 into the first baffle groove 241 with the port 251 of baffle 25 facing outside. Place covered wire/cable into optical fiber guide channel 22. Clamp stripping port 261 at the left end of baffle 25. Pass the bare fiber portion having the coating stripped through curved channel 252 (the gap of curved channel 252 is slightly larger than the circumference volume of bare fiber to ensure the prevention of bare fiber from being damaged). Position it through V-shaped port of V-shaped positioning block 245, and then enter into sharp-angle port 34. Fold the first handle 11 and the second handle 12 and strip coating 262 with the first stripping blade 31 and the second stripping blade 32 to form incision 263. Continue moving stripper or pull out cable toward the opposite direction and strip the coating at the right side of incision 263. The length of the coating 262 between stripping port 261 and incision 263 is 24 mm.

If reserved length of coating is 19.5 mm, insert baffle 25 into a third baffle groove 243, align stripping port 261 with the left end of baffle 25. After stripping the coating, the length of coating 262 between stripping port 261 and incision 263 is 19.5 mm.

If reserved length of coating is 2 mm, align stripping port 261 with V-shaped positioning block 245. After stripping the coating, the length of coating 262 between stripping port 261 and incision 263 is 2 mm.

If reserved length of coating is 18 mm, align stripping port 261 with positioning block 244. After stripping the coating, the length of coating 262 between stripping port 261 and incision 263 is 18 mm.

Because the outsides of the first stripping blade 31 and the second stripping blade 32 of sharp-angle ports are made into chamfers 342, under the initial state, a gap exists between outsides of two sharp-angle ports 34. Place bare cable having the coating stripped directly into the second groove 341 through the gap. Due to the design of chamfer 342, it not only makes a gap to be present in the outside of sharp-angle port, but also passivates the outside of sharp-angle port to prevent bare fiber from being cut off by the outside of sharp-angle port, when placing bare fiber. In addition, it is very convenient to place bare fiber.

Please refer to FIGS. 1-9, specific procedures are shown below according to a preferred embodiment of the present invention:

Rotate adjustable screws 4 to determine cutting depth in cable by the first stripping blade 31 and the second stripping blade 32 to ensure exact cutting of covered wire/cable without damaging optical fiber. Insert covered cables through adaptor channel 21 on top of optical fiber stripper. Place the required length (the required length is measured by length scale 15). Hold tightly the handles. Fold the first stripping blade 31 and the second stripping blade 32 from both ends of blade where blades 35 are aligned with the adaptor channel 21, positioning guide channel 23 toward the covered wire/cable. Slit the jacket of covered wire/cable by blades 35. After that, pull covered wire/cable from the opposite direction to strip the jacket. Next, perform operation of stripping optical fiber coating. Based on required reserved length of coating, select corresponding baffle groove to place baffle or to directly select corresponding positioning block. Place covered wire/cable having jacket partially stripped and bare fibers in optical fiber guide channel 22 of reference block 2. Use baffle or positioning block to position. Then, hold tightly the handles. Fold the first stripping blade 31 and the second stripping blade 32 inwardly from both ends of blade positioning guide channel 23. Pull the stripper along the direction of optical fiber or pull covered wire/cable in the opposite direction to strip the coating of bare fiber. When stripping jumper, first, use Kevlar scissors to slit the jacket of jumper, strip Kevlar wire to expose the optical fiber jacket reinforcing layer having an outer diameter of 900 μm. Place the optical fiber jacket reinforcing layer having an outer diameter of 900 μm into optical fiber jacket stripping sub-channel 27. Hold tightly the handles. Fold the first stripping blade 31 and the second stripping blade 32 inwardly from both ends of blade positioning guide channel 23. Strip the jacket of optical fiber having an outer diameter of 900 μm by blades 35 on port 37 for stripping optical fiber jacket having an outer diameter of 900 μm. Then, pull the stripper along the direction of the optical fiber or pull jumper in the opposite direction to strip the jacket of optical fiber having an outer diameter of 900 μm. Next, perform operation of stripping optical fiber coating as above.

The above disclosures are only specific embodiments of the present invention. These disclosed embodiments are only used for more clearly describing the present invention and not for limiting the present invention. Any variations considered by one skilled in the art should all fall within the scope of protection.

The invention claimed is:

1. An optical fiber stripper, comprising
    a first handle,
    a second handle,
    a first stripping blade,
    a second stripping blade,
    a reference block, and
    a stroke position adjuster comprising an adjustable screw and a block pin, the block pin being installed on the reference block and the adjustable screw abutting the block pin,
    wherein the first handle and the second handle are movably connected with the reference block through a first handle rotating shaft and a second handle rotating shaft, respectively, and the first stripping blade and the second stripping blade are disposed on the first handle and the second handle through a first blade rotating shaft and a second blade rotating shaft, respectively,
    wherein the reference block comprises an optical fiber guide channel, through which an optical fiber is capable of passing,
    wherein the optical fiber guide channel comprises an optical fiber jacket stripping sub-channel for stripping a jacket of the optical fiber to expose a bare fiber of the optical fiber, a covered wire/cable jacket stripping sub-channel for stripping a jacket of a covered wire/cable to expose a bare fiber of the covered wire/cable, and a bare fiber coating stripping sub-channel for stripping a coating of the bare fiber of the optical fiber to expose a fiber core of the bare fiber of the optical fiber,
    wherein the optical fiber jacket stripping sub-channel, the covered wire/cable jacket stripping sub-channel, and the bare fiber coating stripping sub-channel are disposed in parallel; and a blade-positioning guide channel interconnected with the first stripping blade and the second stripping blade, respectively, is disposed through the optical fiber guide channel in an up and down cutting direction toward the optical fiber,
    wherein the first stripping blade and the second stripping blade moving up and down in the blade positioning guide channel to cut an object of interest, the stroke position adjuster is connected with the reference block to adjust a cutting stroke of the first stripping blade and/or the second stripping blade, and
    wherein the optical fiber guide channel contains at least one baffle groove and a baffle, the baffle is inserted into the at least one baffle groove and has an opening port formed by a curved channel recessed into the baffle in a direction perpendicular to an insertion direction of the optical fiber.

2. The optical fiber stripper of claim 1, wherein, when the first stripping blade and the second stripping blade are at a clamping state to perform a clamping action, the first stripping blade and the second stripping blade are interlaced in a form of a pair of scissors.

3. The optical fiber stripper of claim 1, wherein the first stripping blade and the second stripping blade, respectively, comprise an optical fiber jacket stripping port in a V-shape without a groove at a top or a bottom of the optical fiber jacket stripping port, a first port in a straight shape with a first groove at a top or a bottom of the first port, and a sharp-angle port in a V-shape with a second groove at a top or a bottom of the sharp-angle port,
    wherein the optical fiber jacket stripping port, the first port, and the sharp-angle port, respectively, are disposed in correspondence to the optical fiber jacket stripping sub-channel, the covered wire/cable jacket stripping sub-channel, and the bare fiber coating stripping sub-channel, wherein the bottom of the first port and the bottom of the optical fiber jacket stripping port comprise blades, and the first groove for holding the optical fiber and for passing the bare fiber of the optical fiber without being damaged is disposed on the bottom of the first port along a moving direction of the optical fiber, wherein the covered wire/cable jacket stripping sub-channel comprises an adaptor channel fitting the first port, and, when the first stripping blade and the second stripping blade are in a pressing state, the first stripping blade and the second stripping blade are configured to tightly clamp the optical fiber and the first groove forms a channel, through which the bare fiber of the optical fiber passes through without being damaged.

4. The optical fiber stripper of claim 3, wherein the first stripping blade and the second stripping blade respectively comprise the sharp-angle port, wherein the bottom of the sharp-angle port comprises a blade, wherein the second groove holding the fiber core having the bare fiber coating stripped is configured to be disposed at the bottom of the sharp-angle port along the moving direction of the optical fiber, the bare fiber coating stripping sub-channel comprises the optical fiber guide channel fitting the sharp-angle port, wherein, when the first stripping blade and the second stripping blade are in the pressing state, the first stripping blade and the second stripping blade are configured to tightly clamp the optical fiber, and the second groove forms a channel, through which the fiber core having the coating stripped is capable of passing without being damaged.

5. The optical fiber stripper of claim 4, wherein an outside of the sharp-angle port is formed into a chamfer.

6. An optical fiber stripper, comprising
a first handle,
a second handle,
a first stripping blade,
a second stripping blade,
a reference block, and
a stroke position adjuster comprising an adjustable screw and a block pin, the block pin being installed on the reference block and the adjustable screw abutting the block pin, wherein the first handle and the second handle are movably connected with the reference block through a first handle rotating shaft and a second handle rotating shaft, respectively, and the first stripping blade and the second stripping blade are disposed on the first handle and the second handle through a first blade rotating shaft and a second blade rotating shaft, respectively, wherein the reference block comprises an optical fiber guide channel, through which an optical fiber is capable of passing, wherein the optical fiber guide channel comprises an optical fiber jacket stripping sub-channel for stripping a jacket of the optical fiber to expose a bare fiber of the optical fiber, a covered wire/cable jacket stripping sub-channel for stripping a jacket of a covered wire/cable to expose a bare fiber of the covered wire/cable, and a bare fiber coating stripping sub-channel for stripping a coating of the bare fiber of the optical fiber to expose a fiber core of the bare fiber of the optical fiber, wherein the optical fiber jacket stripping sub-channel, the covered wire/cable jacket stripping sub-channel, and the bare fiber coating stripping sub-channel are disposed in parallel; and a blade-positioning guide channel interconnected with the first stripping blade and the second stripping blade, respectively, is disposed through the optical fiber guide channel in an up and down cutting direction toward the optical fiber, wherein the first stripping blade and the second stripping blade moving up and down in the blade positioning guide channel to cut an object of interest, the stroke position adjuster is connected with the reference block to adjust a cutting stroke of the first stripping blade and/or the second stripping blade, wherein the optical fiber guide channel contains at least one baffle groove and a baffle, the baffle is inserted into the at least one baffle groove, and wherein the baffle contains a V-shaped baffle port, and a curved baffle channel located at a bottom of the V-shaped baffle port.

* * * * *